Dec. 12, 1950   W. J. HUSHLEY ET AL   2,533,809
PROTECTION OF PHOSPHORS FROM ATTACK BY ALKALI VAPORS
Filed July 3, 1948

WITNESSES:
Robert C. Baird
Wм. L. Groome

INVENTORS
Walter J. Hushley and
William McC. Siebert.
BY
F. W. Lyle
ATTORNEY

Patented Dec. 12, 1950

2,533,809

UNITED STATES PATENT OFFICE 2,533,809

PROTECTION OF PHOSPHORS FROM ATTACK BY ALKALI VAPORS

Walter J. Hushley and William McC. Siebert, Pittsburgh, Pa., assignors to Westinghouse Electric Corporation, East Pittsburgh, Pa., a corporation of Pennsylvania Application July 3, 1948, Serial No. 36,958

5 Claims. (Cl. 250—164)

Our invention relates to radiation-emitting screens and, in particular, relates to a process for making light-emitting screens for use in electrical discharge tubes in which electron images corresponding to a light image are first produced, and then a second light image which is an intensified replica of the initial light image is produced by incidence of the electrons on a fluorescent screen.

One example of an electrical discharge device of this type is shown and claimed in Lloyd P. Hunter and Richard Longini application, Serial No. 771,112, for an Image Intensifier, filed about August 28, 1947 which claims certain subject-matter herein disclosed. In the device just mentioned, an electron image is generated by a photoelectric surface through the agency of light emanating from an X-ray picture on a fluorescent screen; the electrons are then accelerated to high velocity and into incidence upon a screen comprising a cathode ray phosphor, and the light image produced on the latter is observed. In the electrical discharge tube just described, the photoelectric surface comprises materials such as cesium which are highly active chemically and have a vapor of a substantial pressure and there is likelihood that chemical reaction will occur between the photoelectric components and those of the screen during processing. It is, accordingly, necessary to provide some protective coating capable of preventing this reaction.

One object of our invention is, accordingly, to provide a novel type of fluorescent screen in which the fluorescent material is provided with a coating which is substantially transparent to incident electrons and is capable of preventing chemical reaction between the phosphor of the screen and cesium vapor.

Another object of our invention is to provide a protective coating for the particles comprised in a fluorescent screen which shall prevent chemical reaction between them and vapors present in the space around them.

Still another object of our invention is to provide an improved form of electron phosphor screen in which chemical reaction between phosphor and an environing atmosphere is prevented.

A still more specific object of our invention is to provide a method of protecting zinc cadmium sulphide from chemical reaction with the vapor of photoelectrically active materials.

A still further object of our invention is to provide a method of preventing chemical reaction between phosphors of zinc cadmium sulphide with the components of a cesiated antimony located in a common container therewith.

Other objects of our invention will become apparent upon reading the following description, taken in connection with the drawing, in which.

Figure 1:
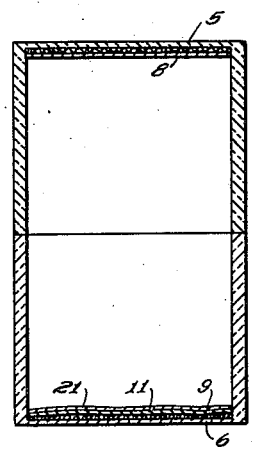
Figure 1 shows a view in longitudinal section of an electrical discharge tube containing a phosphor screen protected in accordance with the principles of our invention.
Figure 2:
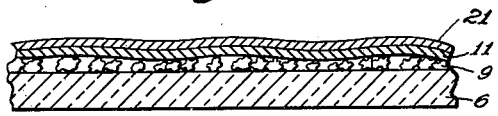
Fig. 2 is an enlarged view in section of the screen forming a wall portion of Fig. 1.
Figure 3:
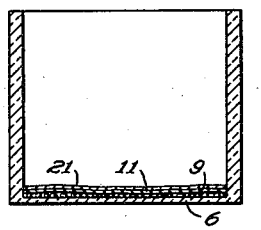
Fig. 3 is a sectional view of the lower portion of the tube of Fig. 1 at an intermediate point on its fabrication.

Referring in detail to the drawing, the phosphor screen, in accordance with our invention, comprises a layer 9 made up of particles of a phosphor, such, for example, as silver-activated zinc cadmium sulphide, which is deposited on a portion of the wall 6 of a container 4 of glass or other suitable material. The container 4 may be a vacuum-tight enclosure, such as the tube 4 in the above-mentioned Hunter and Longini application. As is illustrated in said application, the enclosure 4 may contain during processing a substantial pressure of the vapor of some photoelectric material, such, for example, as cesium used to produce a layer 8 of cesiated antimony located on a fluorescent screen 5 positioned in the container 4. As has been stated above, there is a likelihood of chemical reaction between the phosphor of the layer 9 and vapor just mentioned, and to prevent such undesired chemical reaction, the phosphor layer 9 is protected by a composite layer 21, 11 consisting of silicon monoxide supported on aluminum which is applied in a manner about to be described.

The phosphor layer 9 may be deposited upon the wall portion 6 by producing a mixture or suspension of finely divided zinc cadmium sulphide in a water solution containing about 5% by weight of potassium silicate. The suspension may comprise about three milligrams of the phosphor per cubic centimeter of the liquid, and this suspension or mixture may be poured to form a layer of a predetermined depth in the container 4 at an early stage of manufacture of the latter before it is assembled into the complete electron discharge tube of which it is later to form a part. The amount of suspension poured into the container 4 should correspond with the thickness of the phosphor layer ultimately desired; for example, we have found for many purposes that a suspension of the composition just described may be poured into the container 4 to a depth of two centimeters. The container 4 is then allowed to stand for a sufficient time so that the phosphor is settled in the container to form a uniform layer all over the bottom thereof. When this has occurred, the supernatant liquid may be carefully siphoned off, or even poured off, very slowly so as not to disturb the phosphor layer on the wall 6. After most of the supernatant liquid is thus removed, the layer may be allowed to dry by evaporation and be subsequently baked for thirty minutes at about 130° C. and thereafter for another thirty minutes at about 350° C. This will form a uniform layer of the phosphor all over the wall portion 6.

The phosphor layer 9 having been formed as above, a thin layer 11 of aluminum, about 2000 angstroms thick, is next laid down on the phosphor by the following procedure.

The cup containing the settled screen may be rinsed with both acetone and distilled water. A few cubic centimeters of distilled water should then be poured in and partially removed with a capillary tube connected to a water aspirator. Impurities such as scum or dust floating on the surface may be drawn off by just touching the surface with the capillary. A final depth of water of a few millimeters has been found convenient.

An organic film is then laid on the water. The filming solution used may be collodion.

A drop of filming solution is then dropped onto the surface of the water. The dropper should be held vertically with the tip about 3-5 mm. from the surface. Motion of the dropper should be avoided. If the drop falls from too great a height or has components of velocity due to motion of the dropper, small bubbles may be formed in the film which will become weak spots or holes.

To maintain drop size a special dropper with a long slender tip may be used. A drop of collodion from this dropper weighs 7-8 mg.

Drying should now proceed for about 15 minutes in a place free from circulating air currents. At the end of this time a ring of brass or copper may be lowered carefully onto the surface of the film. This ring serves to cut the film loose from the sides of the container 4 and maintain it taut over the area to be used. The bulk of the water is then removed with the capillary from outside the ring. The ring is then cut loose by running the capillary around the inside touching at adjacent points. The ring can now be removed, care being taken to cut any remaining connections to the film as the ring is lifted off. The whole process of removing water should take less than two minutes.

At this point the film should be in very close contact with the phosphor, held down by the small amount of water still remaining underneath. In a few spots the water may have dried out and the film have become shiny and "pulled up." Drying should be hastened with a fine gentle stream of air until the film has "pulled up" uniformly over the whole phosphor area. The total time, from applying the drop of filming solution to final drying of the film, may be about eighteen minutes.

Generally the filming solution has sufficient latitude to permit considerable variation in these factors without unsatisfactory results. If films are consistently too "pulled up" or too "stuck down," the time of drying previous to removal of the water should be shortened or lengthened accordingly.

A layer of aluminum is placed over the film by evaporation in a vacuum. To describe one suitable procedure, a filament is formed from a few 15-20 mil. tungsten wires twisted together and bent into a V shape. Two small pieces of clean aluminum wire, total weight about 30 mg., are bent into the shape of a U and hung over the tungsten filament at the bottom of the V. A jig may be constructed to hold the phosphor cups with the film-covered phosphor surface about 10 cm. from the filament. A bell jar is placed over the assembly, and the chamber pumped down to a pressure of $10^{-3}$–$10^{-4}$ mm. of Hg. The filament is then heated by passing a current through it, and the aluminum evaporated. The foil so formed will be about 2000 angstroms thick.

It is now only necessary to bake-out the film. The aluminized phosphors are placed in an oven and the temperature brought slowly (over a period of about 1-2 hours) to 350° C. where it should be left for at least 5 hours, or better, overnight. A final bake of 30 minutes to an hour at 400° C. will remove the last traces of organic matter. There should be no visible change in the foil or phosphor during this process.

Upon the aluminum layer thus produced, we deposit a layer about 1000 angstroms thick of silicon monoxide by any procedure known in the vacuum tube art as suitable. For example, silicon monoxide may be placed within a coil of tungsten wire or in a V-shaped boat made of molybdenum or tantalum ribbon, and heated by passing current through the wire or ribbon. The evaporation is carried out, of course, in an evacuated chamber such as described in connection with the deposition of aluminum.

While we have described aluminum as the base on which the silicon monoxide is deposited, other substances such as magnesium or beryllium may be deposited and utilized in similar ways. Likewise ordinary collodion solution may be used instead of the pyroxylin-butyl acetate-dibutyl oxalate mixture for the film where cruder results are sufficiently satisfactory.

While we have described the wall 6 on which the phosphor layer 9 is formed as part of the wall of tube 4, it will be recognized that the support 6 may be a separate glass plate on which the above-described process may be carried out by placing it in the bottom of a suitable glass container, the separate screen thus formed being available for later installation within a vacuum-tight container 4 when desired.

We claim as our invention:

1. An electron discharge tube comprising a vacuum-tight container having a light-emitting screen comprising a layer of zinc cadmium sulphide protected by a layer of aluminum coated with silicon monoxide.

2. A vacuum-tight container containing a surface coated with photoelectric material and another surface comprising a phosphor protected by a layer of metal coated with silicon monoxide.

3. A vacuum-tight container containing a surface coated with photoelectric material and another surface comprising zinc cadmium sulphide protected by a layer of aluminum coated with silicon monoxide.

4. A vacuum-tight container enclosing a structural member containing a substantial quantity of cesium and having a screen comprising a phosphor coated with a layer of aluminum coated with silicon monoxide.

5. A vacuum-tight container enclosing a structural member containing a substantial quantity of cesium and having a screen comprising zinc cadmium sulphide coated with a layer of aluminum coated with silicon monoxide.

WALTER J. HUSHLEY.
WILLIAM McC. SIEBERT.

REFERENCES CITED

The following references are of record in the file of this patent:

UNITED STATES PATENTS

| Number | Name | Date |
|---|---|---|
| 2,092,814 | Schaffernicht | Sept. 14, 1937 |
| 2,185,857 | Lubszynski et al. | Jan. 2, 1940 |
| 2,189,322 | Flory | Feb. 6, 1940 |
| 2,335,705 | Smith | May 30, 1943 |
| 2,446,248 | Shrader | Aug. 3, 1948 |